(12) United States Patent
Wu et al.

(10) Patent No.: US 12,534,668 B2
(45) Date of Patent: Jan. 27, 2026

(54) COMPOSITE FOR ENABLING SANDY SOIL TO HAVE WATER RETENTION AND NUTRIENT RETENTION CAPABILITIES, WATER-RETAINING AGENT, AND ITS PREPARATION METHOD AND USE THEREOF

(71) Applicant: Enyi Ren, Guangdong (CN)

(72) Inventors: Peiheng Wu, Stony Brook, NY (US); Enyi Ren, Guangdong (CN)

(73) Assignee: Enyi Ren, Guangdong (CN)

( * ) Notice: Subject to any disclaimer, the term of this patent is extended or adjusted under 35 U.S.C. 154(b) by 119 days.

(21) Appl. No.: 18/535,686

(22) Filed: Dec. 11, 2023

(65) Prior Publication Data

US 2025/0188350 A1 Jun. 12, 2025

(51) Int. Cl.
| | |
|---|---|
| *C09K 17/22* | (2006.01) |
| *C09K 17/32* | (2006.01) |
| *E02D 3/12* | (2006.01) |

(52) U.S. Cl.
CPC ............ *C09K 17/22* (2013.01); *C09K 17/32* (2013.01); *E02D 3/12* (2013.01)

(58) Field of Classification Search
CPC ............ C09K 17/22; C09K 17/32; E02D 3/12
See application file for complete search history.

(56) References Cited

U.S. PATENT DOCUMENTS

| | | | | |
|---|---|---|---|---|
| 7,595,002 | B2 * | 9/2009 | Sikes ................... | C02F 1/5272 |
| | | | | 47/58.1 SC |
| 12,157,850 | B2 * | 12/2024 | Weaver ................. | C09K 17/40 |
| 2006/0058502 | A1 * | 3/2006 | Doane ................... | C08F 251/00 |
| | | | | 530/200 |
| 2011/0003936 | A1 * | 1/2011 | Chen ...................... | C09K 17/18 |
| | | | | 536/63 |
| 2013/0145687 | A1 * | 6/2013 | Cristobal ............... | C09K 17/22 |
| | | | | 47/58.1 SC |
| 2013/0180173 | A1 * | 7/2013 | Caspar ................. | A01G 9/0293 |
| | | | | 47/65.7 |

FOREIGN PATENT DOCUMENTS

| | | | | |
|---|---|---|---|---|
| WO | WO-9812154 A1 * | 3/1998 | ............... | C05G 3/80 |
| WO | WO-2020202092 A1 * | 10/2020 | ............. | C08L 51/02 |

* cited by examiner

*Primary Examiner* — Benjamin F Fiorello
(74) *Attorney, Agent, or Firm* — MUNCY, GEISSLER, OLDS & LOWE, P.C.

(57) ABSTRACT

Disclosed is a composite for enabling sandy soil to have water retention and nutrient retention capabilities, a water-retaining agent, a preparation method, and use thereof. The composite includes polyacrylamide, sodium polyacrylate, and xanthan gum. Also disclosed is a water-retaining agent including the composite and a method for utilizing the composite to improve the water retention and/or nutrient retention capabilities of sandy soil. Through the synergistic effect of polyacrylamide, sodium polyacrylate, and xanthan gum, this invention not only alters the looseness of sandy soil, increases the viscosity, and significantly reduces water loss and volatilization, but also improves the retention capacity of fertilizer nutrients to extend the effective duration. The composite is environmentally friendly, cost-effective, and effectively improves the properties of sand, showing the effects of retaining water and nutrients, facilitating plant growth, and offering high application value.

8 Claims, 3 Drawing Sheets

COMPOSITE FOR ENABLING SANDY SOIL TO HAVE WATER RETENTION AND NUTRIENT RETENTION CAPABILITIES, WATER-RETAINING AGENT, AND ITS PREPARATION METHOD AND USE THEREOF

TECHNICAL FIELD

The present invention pertains to the technical field of soil remediation, specifically focusing on a functionalized composite used as a water-retaining agent to enhance the water and nutrient retention capacity of sandy soil. This invention also includes its preparation method and application.

BACKGROUND

Desertification poses a persistent global ecological problem challenge. This issue has been exacerbated by rapid urbanization and industrialization, resulting in heightened problems such as sandstorms, diminished soil productivity, and biodiversity loss. This has emerged as a significant impediment to sustainable development and environmental improvement. Worldwide, deserts and beaches are surrounded by vast expanses of sandy areas, underscoring the ongoing relevance of sandy soil remediation in environmental research. Due to its limited capacity to retain water and nutrients, sand struggles to retain these essential elements for plant use. Growing plants and crops in sandy landscapes or sandy soil areas encounter numerous limitations. Transforming these sandy regions into cultivable land or for grassing purposes holds the potential to significantly improve the environment. Presently, methods for combating desertification primarily include engineering control, plant restoration, and sand fixation. While these approaches exhibit varying degrees of effectiveness, each comes with drawbacks that limit their large-scale application. Engineering measures primarily involve constructing wind and sand fixation projects to address desertification, but the main drawback lies in the high cost. Plant restoration methods aim to restore desert ecology by planting drought-resistant plants, but require a long period. Sand fixation methods utilize materials to stabilize dunes. Traditional sand fixation materials include both physical preventatives, such as gravel and straw, and chemical fixation materials. Chemical fixation materials primarily involve organic polymers to form a bonding layer on the desert surface to achieve sand fixation. The most widely utilized chemical sand fixation agents are asphalt and crude oil emulsions; however, these products are environmentally unfriendly and exhibit subpar water and nutrient retention performances.

Therefore, addressing the urgent technical challenge of developing a material with a simple formula and high-performance water and nutrient retention is crucial. This material is intended to control the migration of water and nutrients in sand, ultimately enhancing the efficiency of water and nutrient utilization.

SUMMARY

Because of the above-mentioned technical problems, the first objective of the present invention is to provide a composite that enables sandy soil with good water retention and nutrient retention capabilities. This composite is supposed to be environmentally friendly, and cost-effective, with minimal usage, a straightforward preparation procedure, and a promising application prospect.

The second objective of the present invention is to provide a preparation method for the composite to enhance the water retention and nutrient retention capabilities of sandy soil.

The third objective of the present invention is to provide a composite endowing sandy soil with improved water retention and nutrient retention capabilities, which can be used for the preparation of a water-retaining agent, or improving the water retention and nutrient retention capabilities of sandy soil, and/or facilitating plant growth.

The fourth objective of the present invention is to provide a water-retaining agent.

The fifth objective of the present invention is to provide a method for improving the water retention and/or nutrient retention capabilities of sandy soil.

To achieve the above-mentioned objectives, the following technical solutions are used in the present invention:

A composite designed to enhance water retention and nutrient retention capabilities of sandy soil includes polyacrylamide (PAM), sodium polyacrylate (ACR), and xanthan gum (Xgum). Being a hydrophilic polymer, ACR is capable of improving the water retention and nutrient retention capabilities of sandy soil. Meanwhile, PAM can be added because PAM molecules readily entangle either with each other or with ACR molecules, which can improve the binding capacity of the mixture towards water and nutrient molecules. Additionally, Xgum can be employed to further strengthen the hydrophilic property of the mixture and its stability in sandy soil. The molecules of PAM, ACR, and Xgum cross-link to form a three-dimensional (3D) network structure because of PAM. Such composite named the water and nutrient loss control agent (WNLCA), endows sandy soil with improved water and nutrient retention capacity.

Through the synergistic effect of PAM, ACR, and Xgum, the present invention can not only change the looseness of sandy soil, increase the viscosity, and significantly reduce water loss and volatilization, but also improve the retention capacity of fertilizer nutrients to extend the effective duration. This invention provides a simple and eco-friendly technique to retain the water and nutrients in sandy soil, facilitate plant growth, and subsequently remediate the sandy soil.

Preferably, a mass ratio of PAM to ACR to Xgum is (1-3):(1-3):(5-8). More preferably, the mass ratio of PAM to ACR to Xgum is (1-2):(1-3):(6-8). The most preferably, the mass ratio of PAM to ACR to Xgum is 1:1:8. Under these preferable conditions, the composite exhibits significantly enhanced effects in water retention, nutrient retention, and promoting plant growth.

Further, the present invention provides a preparation method for the composite to enable sandy soil to have water retention and nutrient retention capabilities, involving the mixing of the PAM, ACR, and Xgum to obtain the composite for enhancing water retention and nutrient retention capabilities in sandy soil.

Further, the present invention provides use of the composite for enabling sandy soil to have water retention and nutrient retention capabilities in preparing a water-retaining agent, improving the water retention and nutrient retention capabilities of sandy soil, and enhancing plant growth.

Further, the present invention provides a water-retaining agent including the following components:
 (a) the composite for enabling sandy soil to have water retention and nutrient retention capabilities as mentioned above; and
 (b) a solvent.

Preferably, a mass-volume ratio of the composite to solvent is 1:(30-50) mg/mL.

Preferably, the solvent is water.

Further, the present invention provides a method for improving the water retention and/or nutrient retention capabilities of sandy soil, including infiltrating the water-retaining agent as mentioned above into the sandy soil planted with plants or crops.

Preferably, a mass of the water-retaining agent in the sandy soil accounts for 0.25%-0.75%, more preferably 0.50%-0.75%.

Preferably, the plants are lyme grass.

Compared with the prior art, the present invention has the following beneficial effects:

The present invention provides a composite designed to endow sandy soil with water retention and nutrient preservation capabilities, including PAM, ACR, and Xgum. Through the synergistic effect of these three components, the present invention not only alters the looseness of sandy soil, enhances the viscosity, and significantly diminishes water loss and volatilization, but also improves the retention capacity of fertilizer nutrients, thereby extending their effective duration. The composite is environmentally friendly, easy to apply, and effectively improves the sand properties, resulting in the effects of water and nutrient retention, and ultimately facilitating plant growth.

DETAILED DESCRIPTION OF THE INVENTION

The present invention will be further illustrated in the following with the accompanying drawings and specific examples, but the examples do not limit the present invention in any form. Unless otherwise specified, reagents, methods, and equipment used in the present invention are conventional reagents, methods, and equipment in the art.

Example 1 a Composite for Enabling Sandy Soil to have Water Retention and Nutrient Retention Capabilities Polyacrylamide (PAM, purchased from Hushi, Sinopharm Chemical Reagent Co., Ltd., product No. 30503770, batch No. 220140225, molecular weight of 10000000), sodium polyacrylate (ACR, purchased from Hushi, Sinopharm Chemical Reagent Co., Ltd., product No. 30213370, batch No. 20180316) and xanthan gum (Xgum) were mixed evenly according to a mass ratio of 1:1:5, and a composite for enabling sandy soil to have water retention and nutrient retention capabilities was obtained.

Example 2 a Composite for Enabling Sandy Soil to have Water Retention and Nutrient Retention Capabilities The present example is different from Example 1 in that PAM, ACR, and Xgum were mixed evenly according to a mass ratio of 1:1:8.

Example 3 a Composite for Enabling Sandy Soil to have Water Retention and Nutrient Retention Capabilities The present example is different from Example 1 in that PAM, ACR, and Xgum were mixed evenly according to a mass ratio of 2:3:7.

Figure 1:
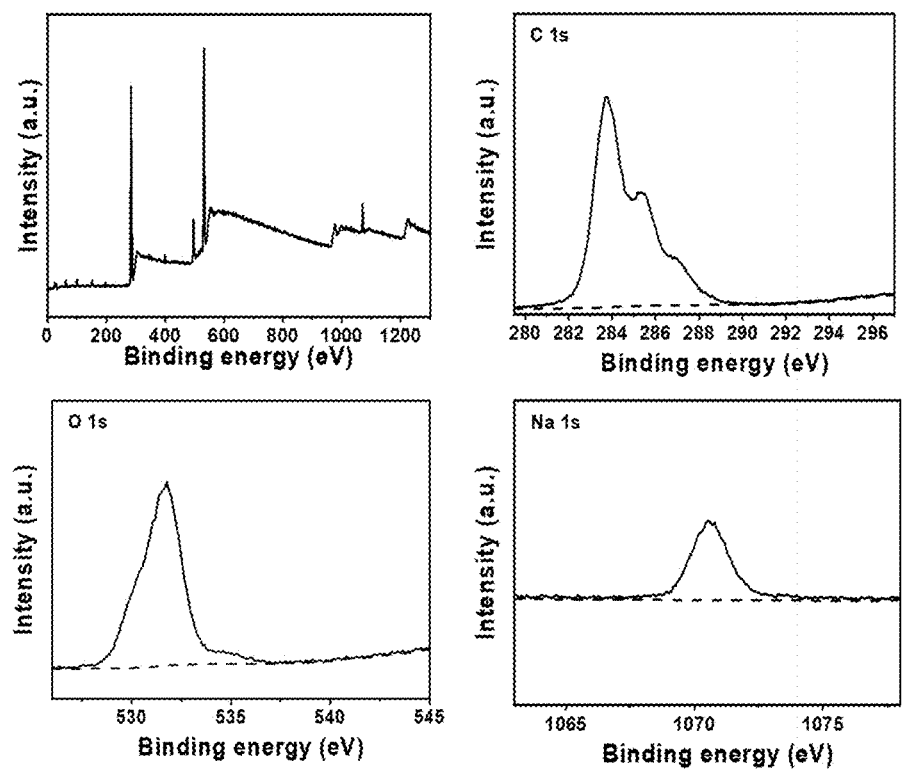
FIG. 1 shows the XPS spectra of a composite prepared by Example 2.

Test Example 1 Characterization of the Composite for Enabling Sandy Soil to have Water Retention and Nutrient Retention Capabilities The composite prepared by Example 2 was subjected to an XPS test. FIG. 1 shows the XPS spectra of the composite prepared by Example 2. It can be seen from FIG. 1 that the composite contains carbon, oxygen, and sodium.

Figure 2:
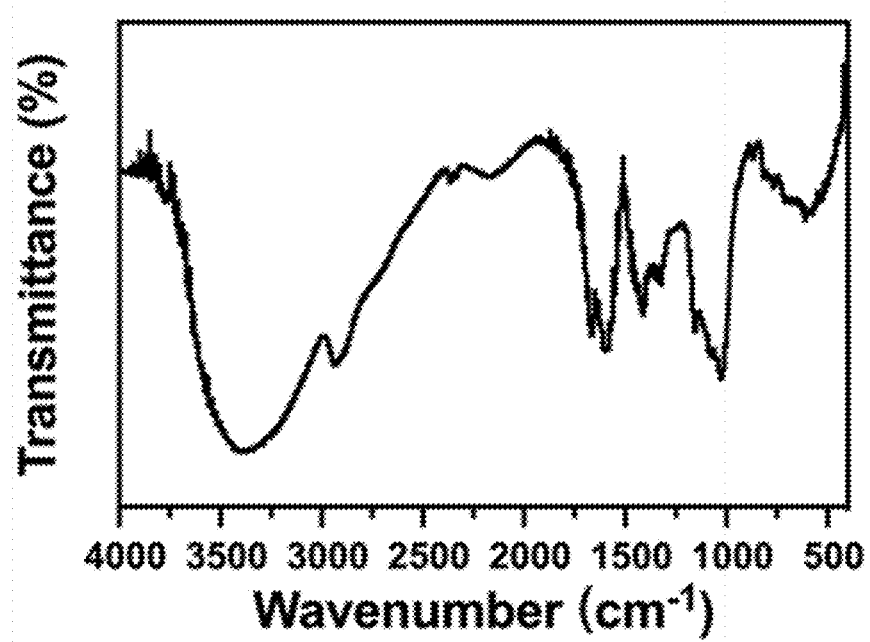
FIG. 2 is an infrared spectrogram of the composite prepared by Example 2.

FIG. 2 is an infrared spectrogram of the composite prepared by Example 2. It can be seen from FIG. 2 that a characteristic peak shows at 1730 $cm^{-1}$ which corresponds to an ester bond form between ACR and Xgum, indicating an esterification reaction between the carboxylic group in ACR and the hydroxyl group in Xgum.

Figure 3:
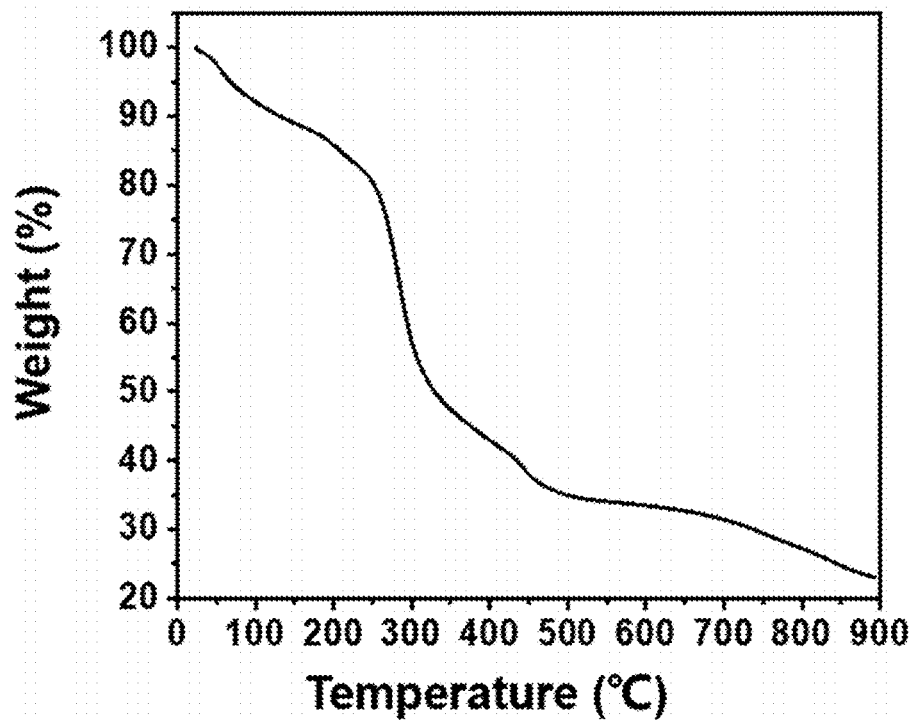
FIG. 3 shows a thermogravimetric analysis curve of the composite prepared by Example 2.

The composite prepared by Example 2 was subjected to a thermogravimetric analysis test. FIG. 3 shows a thermogravimetric analysis curve of the composite prepared by Example 2. It can be seen from FIG. 3 that the mass of the composite drops by less than 10% below 100° C., indicating that the material has a good thermo-stability in the natural environment.

The composite prepared by Example 2 was mixed with water in a mass-volume ratio of 1:40 mg/mL and stirred evenly at room temperature, and then a water-retaining agent was obtained. The water-retaining agent was sprayed evenly over the sandy soil in a dry amount of 0.5 kg/m², and the sprayed drops spontaneously infiltrated into a surface layer of the sandy soil by 10 to 30 cm.

Figure 4:
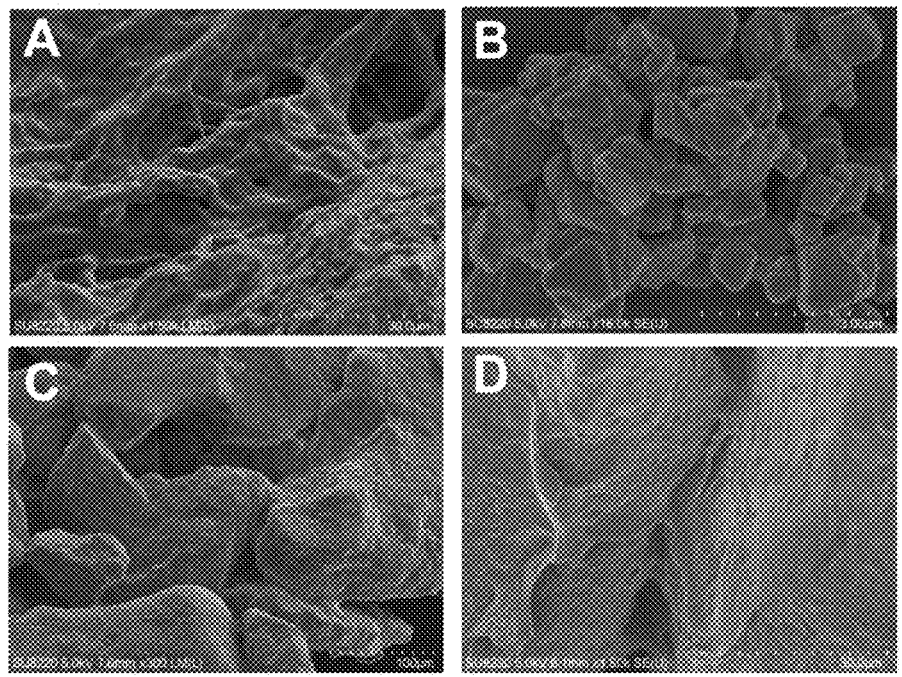
FIG. 4 shows SEM graphs of the composite prepared by Example 2, sand, and sand sprayed and fixed with a water-retaining agent, wherein FIG. A is the SEM graph of the composite prepared by Example 2; FIG. B is the SEM graph of sand; and FIG. C and FIG. D are the SEM graphs of the sand sprayed and fixed with the water-retaining agent.

The composite prepared by Example 2, sand, and the sand sprayed and fixed with the water-retaining agent were observed via SEM. It can be seen from A to D of FIG. 4 that the composite formed a three-dimensional net structure which was loaded on the sand and enabled the sand to adhere to each other so that the sand was fixed by the composite.

Test Example 2 Effects of the Composite on Water Retention and Nutrient Retention of Sandy Soil The water-retaining agent, prepared by Test Example 1, was subjected to a pot experiment as follows: the water-retaining agent (WNLCA) was sprayed onto the surface of 200 g sandy soil (cylindrical with a diameter of 4.5 cm and a depth of 7 cm) according to the mass ratios respectively (the mass ratios of WNLCA to sandy soil were 0%, 0.25%, and 0.50%), and 1% $KNO_3$ was added to the sandy soil as a fertilizer. Then, the obtained sandy soil was seeded with lyme grass seeds, and preserved at 25° C. indoors with 16 hours of lighting (16 h light/8 h dark) for 13 days. Six experimental groups shown in the following were subjected to the above-mentioned pot experiment:
Group 1: sand, without WNLCA, without $KNO_3$;
Group 2: sand+0.25% WNLCA, without $KNO_3$;
Group 3: sand+0.50% WNLCA, without $KNO_3$;
Group 4: sand+$KNO_3$, without WNLCA;
Group 5: sand+0.25% WNLCA+$KNO_3$;
Group 6: sand+0.50% WNLCA+$KNO_3$.

Figure 5:
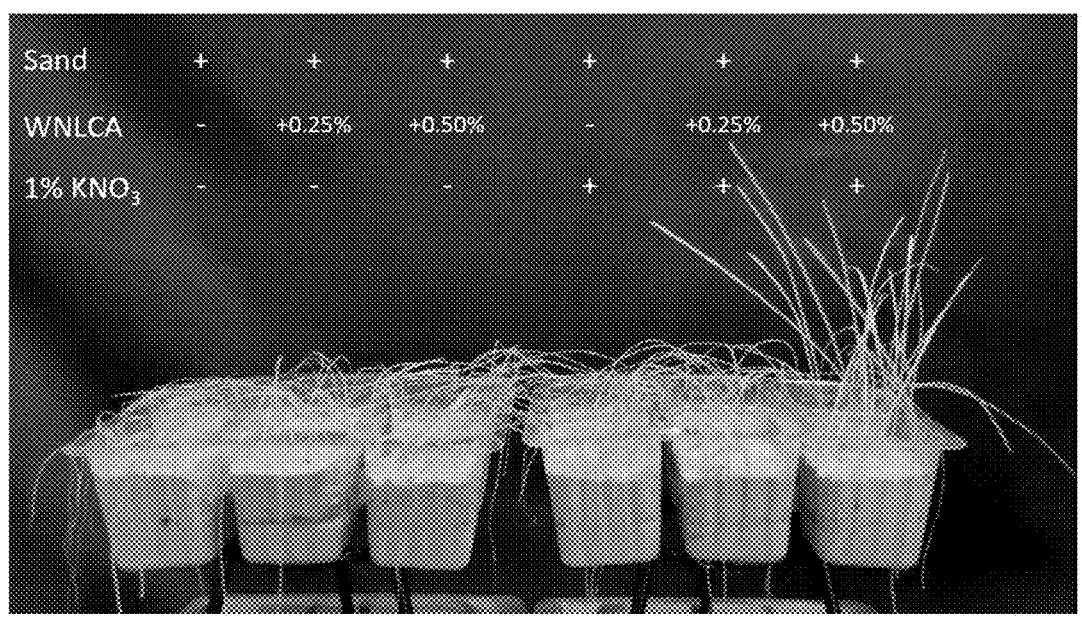
FIG. 5 shows the results of the pot experiment of six groups.

FIG. 5 shows the results of the pot experiment of the six groups. It can be seen from FIG. 5 that compared with other groups, the group added 0.50% WNLCA and the fertilizer significantly increased survival time, indicating that WNLCA enables the sandy soil to have better water retention and nutrient retention capabilities.

Test Example 3 Effects of the Composite on Water Retention and Nutrient Retention of Sandy Soil The composites of Examples 1 to 3 were subjected to the pot experiment according to the method of Test Example 2, wherein the mass of the water-retaining agent in the sandy soil accounted for 0.50%, and 1% $KNO_3$ was added to the sandy soil as a fertilizer. Meanwhile, a control group was established wherein the water-retaining agent was replaced by water, and other operations remained the same as the experimental groups.

Compared with the control group, the group using the composite of Example 1 as the water-retaining agent can reduce the moisture loss by 24%, and the survival time of lyme grass was increased by 10% without continuous watering.

Compared with the control group, the group using the composite of Example 2 as the water-retaining agent can reduce the moisture loss by 42%, and the survival time of lyme grass was increased by 20% without continuous watering.

Compared with the control group, the group using the composite of Example 3 as the water-retaining agent can reduce the moisture loss by 31%, and the survival time of lyme grass was increased by 15% without continuous watering.

The aforementioned examples are only illustrative and are used to explain certain features of the method described in the present invention. The attached claims aim to claim the widest possible scope that can be assumed, and the embodiments presented in the present invention are based on the applicant's actual experimental results for verification. Therefore, the applicant intends that the attached claims are not subject to selection limitations of examples illustrating the features of the present invention. Some numerical ranges used in the claims also include sub-ranges within them, and changes within these ranges should be interpreted as being covered by the attached claims where possible.

What is claimed is:

1. A composite for enabling sandy soil to have water retention and nutrient retention capabilities, comprising polyacrylamide, sodium polyacrylate, and xanthan gum; wherein a mass ratio of polyacrylamide to sodium polyacrylate to xanthan gum is (1-3):(1-3): (5-8).

2. The composite according to claim 1, wherein the mass ratio of polyacrylamide to sodium polyacrylate to xanthan gum is (1-2):(1-3):(6-8).

3. The composite according to claim 1, wherein the composite is prepared by the following: mixing the polyacrylamide, sodium polyacrylate and xanthan gum to obtain the composite for enabling sandy soil to have water retention and nutrient retention capabilities.

4. A water-retaining agent, comprising the following components:
(a) the composite for enabling sandy soil to have water retention and nutrient retention capabilities according to claim 1; and
(b) a solvent.

5. The water-retaining agent according to claim 4, wherein a mass-volume ratio of the composite to solvent is 1: (30-50) mg/mL.

6. A method for improving the water retention and/or nutrient retention capabilities of sandy soil, comprising infiltrating the water-retaining agent according to claim 4 into the sandy soil planted with plants or crops.

7. The method according to claim 6, wherein a mass of the water-retaining agent in the sandy soil accounts for 0.25%-0.75%.

8. The method according to claim 6, wherein the plants are Elymus plants.

* * * * *